No. 724,847. PATENTED APR. 7, 1903.
A. J. GREENAWAY.
CENTRIPETAL TRAP.
APPLICATION FILED SEPT. 16, 1902.
NO MODEL.
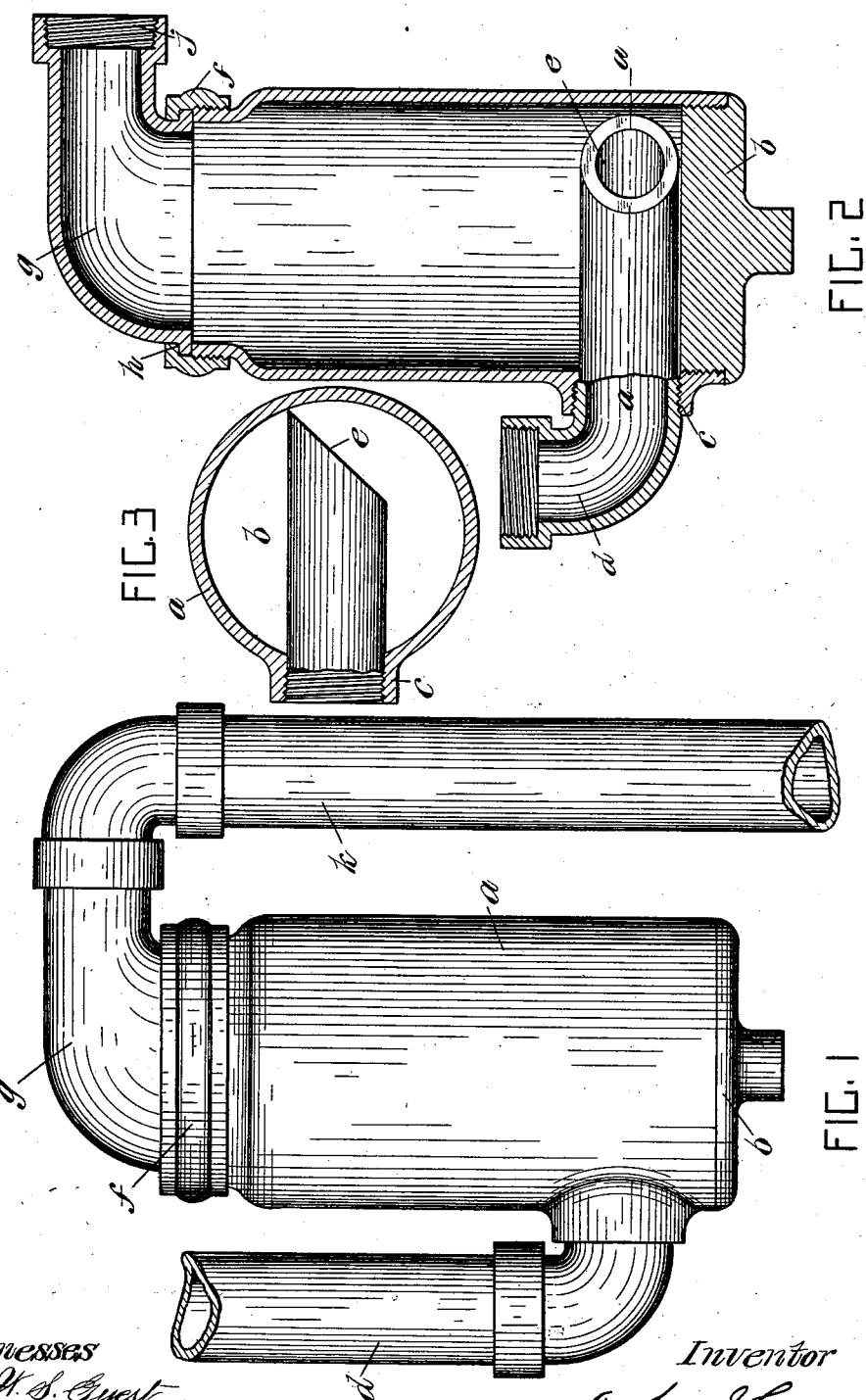
Witnesses
Inventor

UNITED STATES PATENT OFFICE.

ARTHUR J. GREENAWAY, OF DETROIT, MICHIGAN.

CENTRIPETAL TRAP.

SPECIFICATION forming part of Letters Patent No. 724,847, dated April 7, 1903.

Application filed September 16, 1902. Serial No. 123,626. (No model.)

*To all whom it may concern:*

Be it known that I, ARTHUR J. GREENAWAY, of the city of Detroit, in the county of Wayne and State of Michigan, have invented certain Improvements in Centripetal Traps, of which the following is a specification.

This invention relates to a trap in which the water in passing therethrough is given a rotary movement whereby any solid matter held in suspension in the water is conducted by centripetal action to the center and carried off without lodging on the bottom or sides of the trap, as hereinafter more particularly described.

In the drawings forming a part hereof, Figure 1 is a side elevation of the improved centripetal trap, together with the inlet and outlet pipes thereof. Fig. 2 is a central vertical section of the trap without the inlet and outlet pipes. Fig. 3 is a transverse section of Fig. 2, taken on the dotted line $a\ a$.

$a$ represents the trap-body, which is formed of a single piece and cylindrical in shape, with its inner surface smooth. The lower end of the body is closed by a removable plug $b$, which constitutes the bottom of the trap.

Formed in the trap-body $a$ and situated immediately above the top of the plug $b$ is the internally-threaded port $c$, in which is screwed the inlet-pipe $d$, which extends diametrically across the plug $b$. The end $e$ of the pipe $d$ is cut at an angle to the axis of the pipe, as shown in Figs. 2 and 3, in order that water discharged therefrom into the trap-body will be deflected from a straight line, and so strike the inner surface of the body to one side of a point in alinement with the axis of the pipe. By the construction of the pipe $d$ and its arrangement with reference to the wall of the trap-body, as described, a rotary movement is given to the entering water, which movement continues until the water is discharged, and any solid matter held in suspension in the water will by centripetal action be conducted to the center of the trap and away from its surface. The surfaces of the trap will not, therefore, become foul, as in cases where a rotary movement is not imparted to the water in the trap-body.

The upper end of the trap-body $a$ is fitted with a flanged nut $f$ to hold in place the flanged outlet-nozzle $g$, the flange $h$ of which is clamped by the nut to the body. The end of the nozzle $g$ has an internally-threaded enlargement $j$, into which is screwed the discharge-pipe $k$.

I claim as my invention—

In a trap, the body thereof of cylindrical form and fitted with a lower inlet, and an upper outlet pipe, the said inlet-pipe extending diametrically across the bottom of the body and having its end cut at an angle to the axis of the pipe substantially as described, whereby water discharged therefrom is deflected from a straight line and made to strike the wall of the body to one side of a point in alinement with the axis of the pipe, substantially as, and for the purpose specified.

Detroit, May 19, A. D. 1902.

A. J. GREENAWAY.

In presence of—
J. W. POWERS,
E. W. HARMEYER.